United States Patent
Rudolf et al.

(10) Patent No.: US 9,826,376 B2
(45) Date of Patent: *Nov. 21, 2017

(54) SUPPORTING EMERGENCY CALLS ON A WIRELESS LOCAL AREA NETWORK

(71) Applicant: InterDigital Technology Corporation, Wilmington, DE (US)

(72) Inventors: Marian Rudolf, Montreal (CA); Juan Carlos Zuniga, Ville St. Laurent (CA); Shamim Akbar Rahman, Cote St. Luc (CA); Joseph A. Kwak, Bolingbrook, IL (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,142

(22) Filed: Feb. 8, 2016

(65) Prior Publication Data

US 2016/0157077 A1     Jun. 2, 2016

Related U.S. Application Data

(63) Continuation of application No. 14/221,635, filed on Mar. 21, 2014, now Pat. No. 9,258,690, which is a
(Continued)

(51) Int. Cl.
*H04W 4/22*     (2009.01)
*H04W 76/00*   (2009.01)
(Continued)

(52) U.S. Cl.
CPC ............. *H04W 4/22* (2013.01); *H04W 12/08* (2013.01); *H04W 76/007* (2013.01);
(Continued)

(58) Field of Classification Search
CPC ...... H04W 4/22; H04W 76/007; H04W 84/12; H04W 12/08; H04W 48/18; H04W 88/08;
(Continued)

(56) References Cited

U.S. PATENT DOCUMENTS 5,515,419 A    5/1996 Sheffer
5,742,904 A    4/1998 Pinder et al.
(Continued)

FOREIGN PATENT DOCUMENTS

CA    2 617 783    2/2008
EP    1 052 866    11/2000
(Continued)

OTHER PUBLICATIONS

IEEEE Standard for Information Technology—Telecommunications and Information Exchange Between Systems—LAN/MAN Specific Requirements—Part 11: Wireless Medium Access Control (MAC) and Physical Layer (PHY) specifications: Medium Access Control (MAC) Quality of Service (QoS) Enhancements, Amendment 6: Medium Access Control (MAC) Security Enhancements, IEEE P802.11i-2004 (Jul. 23, 2004).
(Continued)

*Primary Examiner* — Matthew Sams
(74) *Attorney, Agent, or Firm* — Volpe and Koenig, P.C.

(57) ABSTRACT

Several methods are provided for communicating emergency call capability information between a station and an access point (AP) in a wireless local area network. The methods include advertising by the AP of its emergency call capabilities and announcing by the station of its emergency call capabilities. The AP can advertise its emergency call capabilities in a beacon frame, a probe response frame, a reassociation response frame, or a reauthentication response frame. The station can announce its emergency call capabilities in an association request frame, a reassociation
(Continued)

request frame, an authentication request frame, or a reauthentication request frame.

13 Claims, 8 Drawing Sheets

Related U.S. Application Data continuation of application No. 11/367,125, filed on Mar. 3, 2006, now Pat. No. 8,682,279, which is a continuation-in-part of application No. 11/124,719, filed on May 9, 2005, now Pat. No. 8,145,182.

(60) Provisional application No. 60/569,014, filed on May 7, 2004, provisional application No. 60/643,190, filed on Jan. 11, 2005.

(51) Int. Cl.
| | | |
|---|---|---|
| *H04W 12/08* | (2009.01) | |
| *H04W 48/12* | (2009.01) | |
| *H04W 48/18* | (2009.01) | |
| *H04W 74/08* | (2009.01) | |
| *H04W 84/12* | (2009.01) | |

(52) U.S. Cl.
CPC ............ *H04W 48/12* (2013.01); *H04W 48/18* (2013.01); *H04W 74/08* (2013.01); *H04W 84/12* (2013.01)

(58) Field of Classification Search
CPC ............ H04W 76/02; H04L 29/12254; H04L 29/12292; H04L 61/2038; H04L 61/2069; H04L 12/5695; H04M 11/04; H04M 1/2535
See application file for complete search history.

(56) References Cited

U.S. PATENT DOCUMENTS

| | | | |
|---|---|---|---|
| 5,862,201 A | 1/1999 | Sands | |
| 6,115,599 A | 9/2000 | Stilp | |
| 6,282,429 B1 | 8/2001 | Baiyor et al. | |
| 6,393,268 B1 | 5/2002 | Biedermann | |
| 6,466,802 B1 | 10/2002 | Blakeney et al. | |
| 6,493,629 B1 | 12/2002 | Van Bosch | |
| 6,584,307 B1 | 6/2003 | Antonucci et al. | |
| 6,659,947 B1 | 12/2003 | Carter et al. | |
| 6,748,211 B1 | 6/2004 | Isaac et al. | |
| 6,756,917 B2 | 6/2004 | Gould et al. | |
| 6,801,762 B1 | 10/2004 | Huilgol | |
| 6,826,394 B1 | 11/2004 | Raith et al. | |
| 6,990,428 B1 | 1/2006 | Kaiser et al. | |
| 7,046,650 B2 | 5/2006 | Sherman | |
| 7,047,002 B2 | 5/2006 | Lazoff | |
| 7,091,851 B2 | 8/2006 | Mason et al. | |
| 7,099,332 B2 | 8/2006 | Leung | |
| 7,103,776 B1 | 9/2006 | Hall | |
| 7,245,900 B1 | 7/2007 | Lamb et al. | |
| 7,274,684 B2 | 9/2007 | Young et al. | |
| 7,280,520 B2* | 10/2007 | Melville | H04W 48/18 370/338 |
| 7,295,556 B2 | 11/2007 | Roese et al. | |
| 7,492,744 B2* | 2/2009 | Dooley | H04L 29/12254 370/310 |
| 7,541,977 B2 | 6/2009 | Ali et al. | |
| 7,746,897 B2* | 6/2010 | Stephenson | H04W 28/20 370/230 |
| 7,877,785 B2* | 1/2011 | Selignan | H04W 4/22 379/37 |
| 8,478,300 B2* | 7/2013 | Kuehnel | H04L 67/16 370/395.2 |
| 8,682,279 B2* | 3/2014 | Rudolf | H04W 4/22 370/310 |
| 9,258,690 B2* | 2/2016 | Rudolf | H04W 4/22 |
| 2001/0036175 A1 | 11/2001 | Hurtta | |
| 2002/0085538 A1 | 7/2002 | Leung | |
| 2002/0095486 A1 | 7/2002 | Bahl | |
| 2002/0133716 A1 | 9/2002 | Harif | |
| 2002/0163906 A1 | 11/2002 | Diachina et al. | |
| 2002/0169539 A1 | 11/2002 | Menard et al. | |
| 2002/0176579 A1 | 11/2002 | Deshpande et al. | |
| 2002/0181425 A1 | 12/2002 | Sherman | |
| 2003/0063714 A1 | 4/2003 | Stumer et al. | |
| 2003/0076812 A1 | 4/2003 | De Benedittis | |
| 2003/0157923 A1* | 8/2003 | Tani | H04M 11/04 455/404.1 |
| 2003/0185200 A1 | 10/2003 | Beyda | |
| 2003/0198331 A1 | 10/2003 | Lass et al. | |
| 2003/0207699 A1 | 11/2003 | Shpak | |
| 2003/0223431 A1* | 12/2003 | Chavez | H04L 12/5695 370/395.42 |
| 2004/0008826 A1 | 1/2004 | Rakoff | |
| 2004/0013128 A1 | 1/2004 | Moreton et al. | |
| 2004/0021569 A1 | 2/2004 | Lepkofker et al. | |
| 2004/0029592 A1 | 2/2004 | Shyy et al. | |
| 2004/0070515 A1 | 4/2004 | Burkley et al. | |
| 2004/0117498 A1 | 6/2004 | Hashimoto et al. | |
| 2004/0141617 A1 | 7/2004 | Volpano | |
| 2004/0151144 A1 | 8/2004 | Benveniste | |
| 2004/0151283 A1 | 8/2004 | Lazoff | |
| 2004/0266427 A1 | 12/2004 | Kurokawa | |
| 2005/0083911 A1 | 4/2005 | Grabelsky et al. | |
| 2005/0151686 A1 | 7/2005 | Ali et al. | |
| 2005/0153698 A1 | 7/2005 | Sahim et al. | |
| 2005/0180367 A1* | 8/2005 | Dooley | H04L 29/12254 370/338 |
| 2005/0185626 A1* | 8/2005 | Meier | H04L 12/4641 370/338 |
| 2005/0286480 A1 | 12/2005 | Akiyama | |
| 2006/0030290 A1* | 2/2006 | Rudolf | H04W 76/007 455/404.1 |
| 2006/0088020 A1 | 4/2006 | Gass | |
| 2006/0106062 A1 | 5/2006 | Kuang et al. | |
| 2006/0165103 A1* | 7/2006 | Trudeau | H04L 12/2854 370/401 |
| 2006/0285507 A1 | 12/2006 | Kinder et al. | |
| 2007/0032219 A1* | 2/2007 | Rudolf | H04W 4/22 455/404.1 |
| 2007/0060097 A1* | 3/2007 | Edge | H04L 65/4007 455/404.1 |
| 2007/0195818 A1* | 8/2007 | Stephenson | H04W 28/20 370/468 |
| 2007/0254624 A1 | 11/2007 | Le Creff et al. | |
| 2007/0270145 A1 | 11/2007 | Feng et al. | |
| 2008/0026728 A1* | 1/2008 | Snapp | H04L 12/66 455/414.1 |
| 2014/0204932 A1* | 7/2014 | Rudolf | H04W 4/22 370/338 |

FOREIGN PATENT DOCUMENTS

| | | |
|---|---|---|
| EP | 1 416 745 | 5/2004 |
| JP | 09-107418 | 4/1997 |
| JP | 2005-027247 | 1/2005 |
| KR | 2004-0028068 | 4/2004 |
| RU | 2003134369 | 3/2005 |
| RU | 2259642 | 8/2005 |
| RU | 2006136984 | 4/2008 |
| WO | 98/24254 | 6/1998 |
| WO | 98/31180 | 7/1998 |
| WO | 00/28765 | 5/2000 |
| WO | 02/03718 | 1/2002 |

OTHER PUBLICATIONS

International Telecommunication Union, "Series H: Audiovisual and Multimedia Systems; Infrastructure of audiovisual services—Supplementary services for multimedia; Support for Multi-Lvel

(56) References Cited

OTHER PUBLICATIONS

Precedence and Preemption (MLPP) within H.323 systems," ITU-T H.460.14 (Mar. 2004).
Third Generation Partnership Project, "Technical Specification Group Services and System Aspects; enhanced Multi Level Precedence and Pre emption service (eMLPP) Stage 1 (3G TS 22.067 version 3.0.1)," 3G TS 22.067 V3.0.1 (Oct. 1999).
Third Generation Partnership Project, "Technical Specification Group Services and System Aspects; enhanced Multi Level Precedence and Pre emption service (eMLPP) Stage 1 (Release 4)," 3GPP TS 22.067 V4.1.0 (Mar. 2000).
Third Generation Partnership Project, "Technical Specification Group Services and System Aspects; enhanced Multi Level Precedence and Pre emption service (eMLPP) Stage 1 (Release 5)," 3GPP TS 22.067 V5.0.0 (Jun. 2002).
Third Generation Partnership Project, "Technical Specification Group Services and System Aspects; enhanced Multi Level Precedence and Pre emption service (eMLPP) Stage 1 (Release 6)," 3GPP TS 22.067 V6.1.0 (Jun. 2003).
"Draft Amendment to STANDARD [for] Information Technology—Telecommunications and Information Exchange Between Systems—LAN/MAN Specific Requirements—Part 11: Wireless Medium Access Control (MAC) and Physical Layer (PHY) specification: Medium Access Control (MAC) Quality of Service (QoS) Enhancements." IEEE P802.11e/D8.0, Feb. 2004.
"IEEE Wireless LAN Edition. A compilation based on IEEE Std 802.11™ -1999 (R2003) and its amendments."
Ecclesine et al., "Wireless LANs. LB71 Comment 957 Location Tracking", dated Nov. 30, 2004, IEEE 802.11, published Jan. 2005.
Faccin et al., "IEEE P802.11 Wireless LANs: WiNOT TGu Proposal for Emergency Services Requirement," IEEE P802.11-06/0288r1 (Mar. 2006).
Gupta et al., "IEEE P802.11 Wireless LANs: Proposal for supporting Emergency Services," IEEE 802.11-05/1244r00 (Mar. 2006).
Hepworth et al., "IEEE P802.11 Wireless LANs: TGu Proposal for E911 Support," IEEE P802.11-06/280r0 (Mar. 2006).
Moreton, "Emergency Call Support," IEEE 802.11-05/1096r2 (Jan. 2006).
Polk et al., "Dynamic Host Configuration Protocol Option for Coordinate-based Location Configuration Information", Request for Comments: 3825, Network Working Group, The Internet Engineering Task Force, Jul. 2004.
Stephenson, "IEEE P802.11 Wireless LANs: Expedited Bandwidth Request," IEEE 802.11-yy/xxxxr0 (Mar. 2006).
Stephenson, "IEEE P802.11 Wireless LANs: Expedited Bandwidth Request," IEEE 802.11-06/0268r0 (Mar. 2006).
Third Generation Partnership Project, "Technical Specification Group GSM/EDGE Radio Access Network; Generic access to the A/Gb interface; Stage 2 (Release 6)," 3GPP TS 43.318 V6.1.0 (Apr. 2005).
Third Generation Partnership Project, "Technical Specification Group GSM/EDGE Radio Access Network Generic Access (GA) to the A/Gb interface; Mobile GA interface layer 3 specification (Release 6)," 3GPP TS 44.318 V6.0.0 (Apr. 2005).
Third Generation Partnership Project, "Technical Specification Group GSM/EDGE Radio Access Network Generic Access to the A/Gb interface; Mobile Generic Access Interface Later 3 Specification (Release x)," 3GPP TS 44.318 Vx.1.0 (Jan. 2005).
Third Generation Partnership Project, "Technical Specification Group GSM/EDGE Radio Access Network; Generic Access to the A/Gb interface; Stage 2 (Release 6)," 3GPP TS 43.318 V2.0.0 (Jan. 2005).
Draft Supplement to Standard for Telecommunications and Information Exchange Between Systems—LAN/MAN Specific Requirements—Part 11: Wireless Medium Access Control (MAC) and physical layer (PHY) specification: Specification for Radio Resource Management, IEEE std 802.11kD0.14 (Mar. 2004).

\* cited by examiner

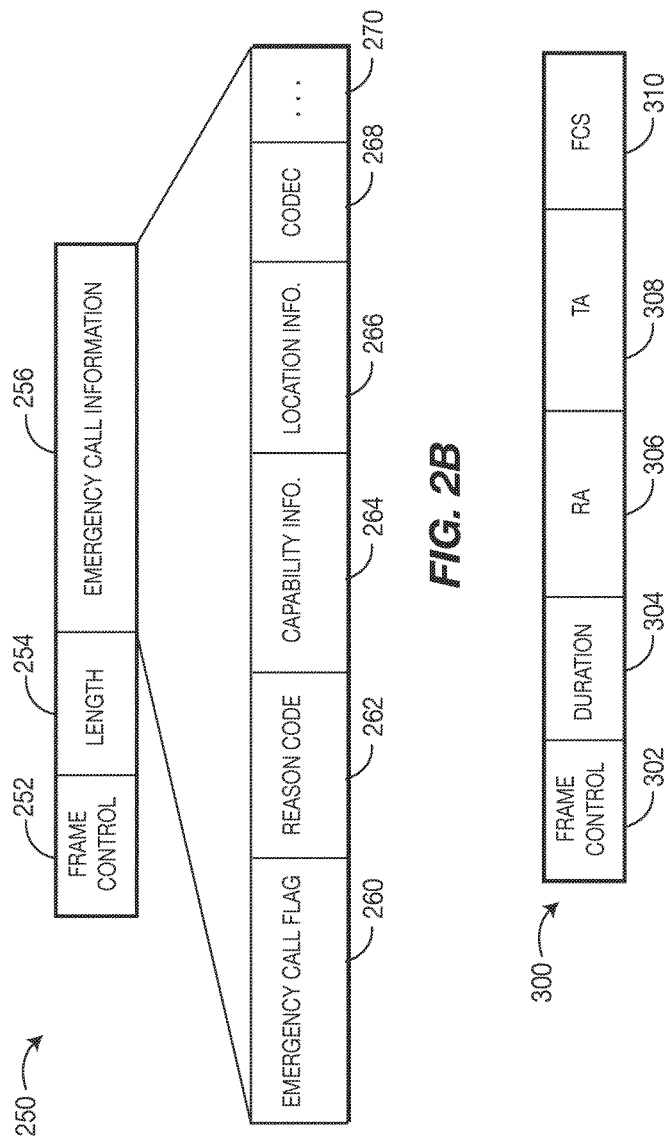

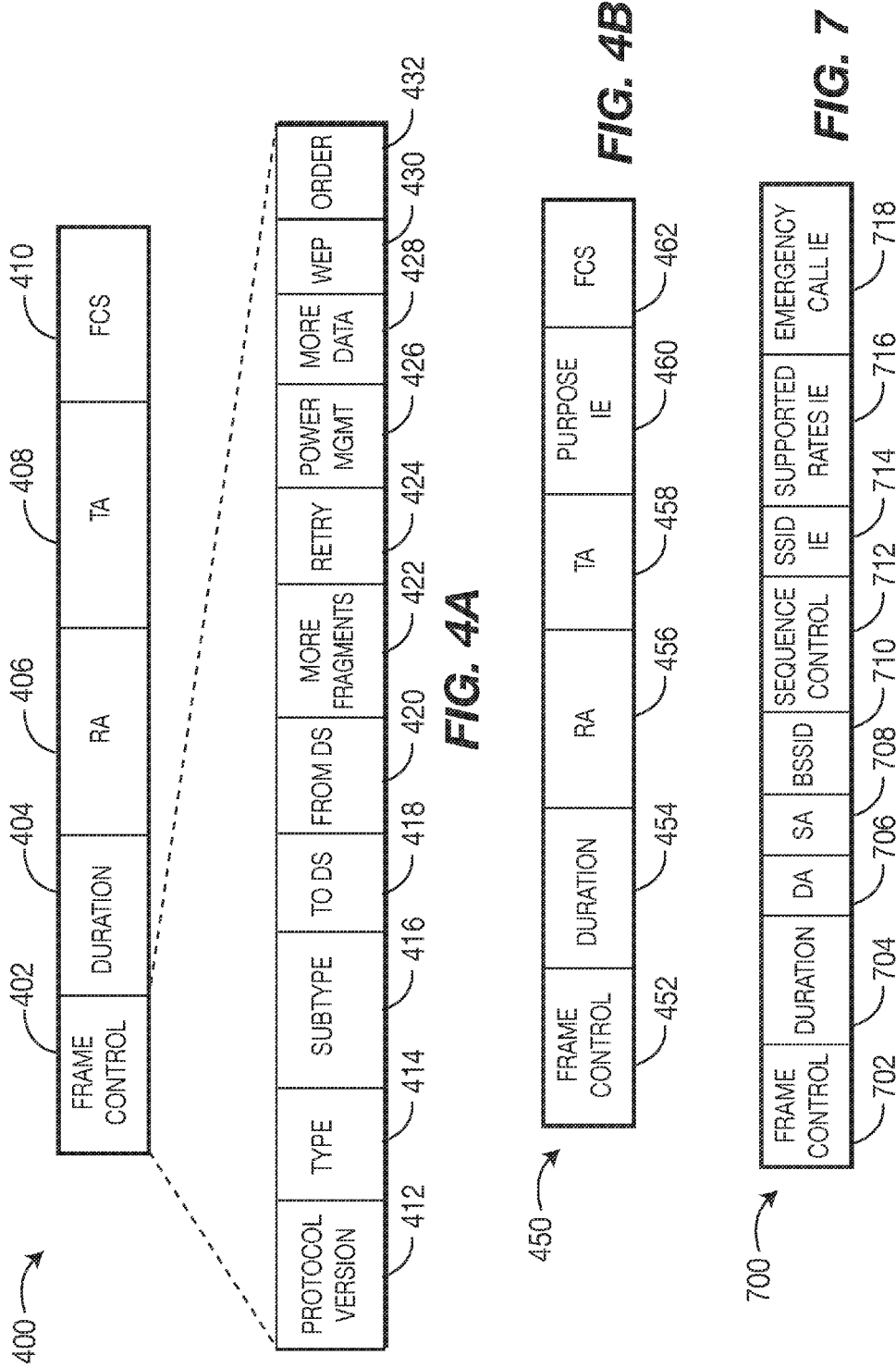

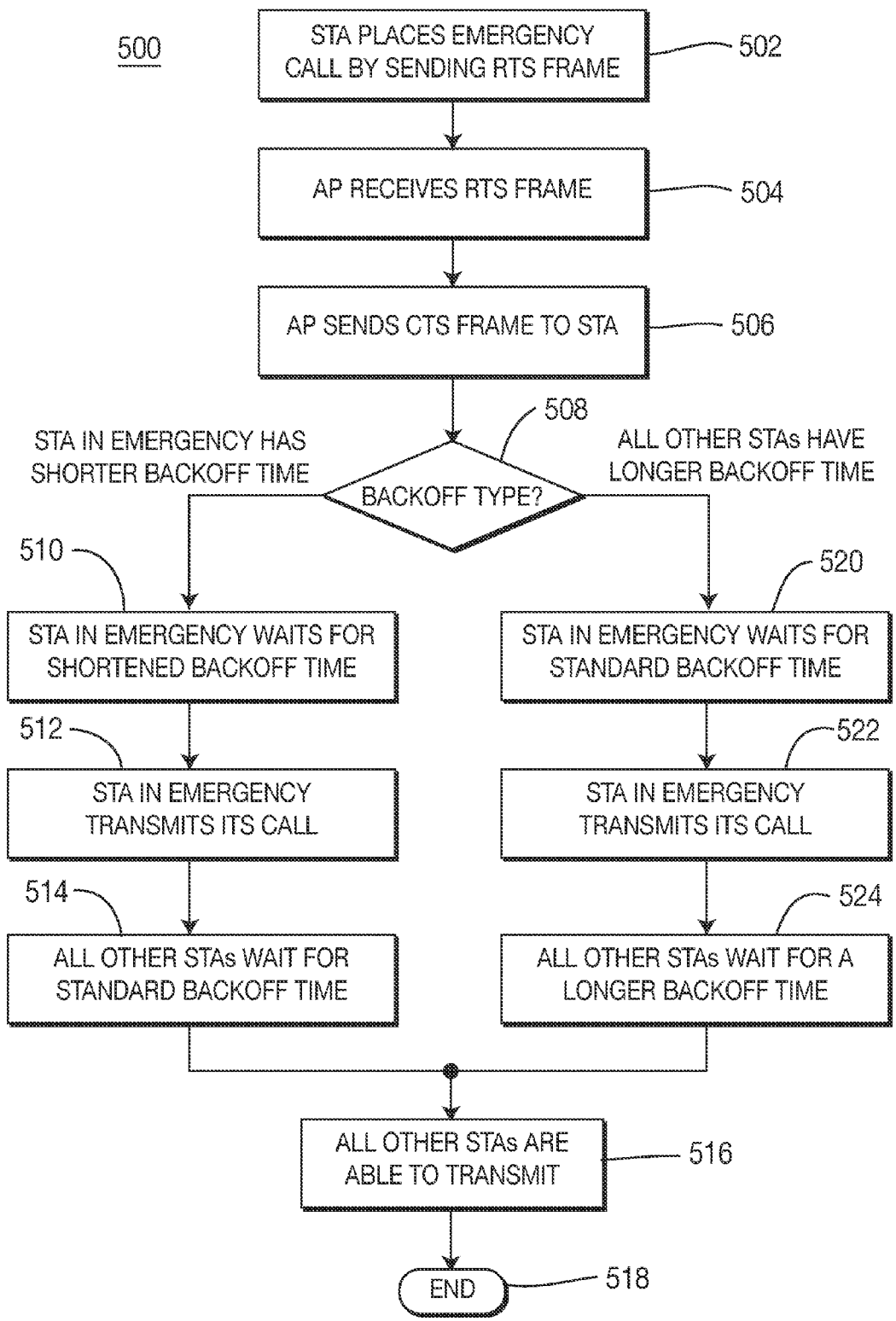

SUPPORTING EMERGENCY CALLS ON A WIRELESS LOCAL AREA NETWORK

CROSS REFERENCE TO RELATED APPLICATIONS

This application is a continuation of U.S. patent application Ser. No. 14/221,635, filed Mar. 21, 2014, which is a continuation of U.S. patent application Ser. No. 11/367,125, filed Mar. 3, 2006, which issued as U.S. Pat. No. 8,682,279 on Mar. 25, 2014, which is a continuation in part of U.S. patent application Ser. No. 11/124,719, filed May 9, 2005, which issued as U.S. Pat. No. 8,145,182 on Mar. 27, 2012, which in turn claims benefit of U.S. Provisional Application Nos. 60/569,014, filed May 7, 2004 and 60/643,190, filed Jan. 11, 2005, which are incorporated by reference as if fully set forth.

FIELD OF INVENTION

The present invention generally relates to wireless local area networks (WLANs), and more particularly, to supporting emergency calls in a WLAN.

BACKGROUND

Existing 802 technology (802.11 WLANs, 802.15 wireless personal area networks (WPANs), etc.) traditionally does not have to support emergency calls like cellular does. For cellular, support of emergency calls often resulted from regulatory requirements imposed on the technology and is therefore widely implemented in most of today's deployed wireless cellular networks and handsets. Support for emergency calls involves many aspects across all communication layers, especially signaling support and mandated procedures, which are non-existent for 802.11 and 802.15 technologies. With the advent of Voice over Internet Protocol (VoIP) in WLANs and increased everyday usage of WLANs, support for emergency calls in WLANs will become necessary.

Even "fixed" VoIP phone service offerings for the residential market have limited emergency call support. Number location information cannot always be tracked by a dispatcher in a public safety answering point (PSAP), call back is not always possible, and address registration may be required upon purchase of the equipment. When the VoIP phone is moved to a new location, the emergency call will still be sent based on the registered address location. The registered address can be changed in principle, but delays are at least on the order of days or weeks in updating the information at the PSAP. In addition, some users might not update their registration information in a timely manner, if at all.

This situation worsens with more mobility as enabled by VoIP phones using WLANs. WLAN based VoIP phones can work from any location and the user can be expected to roam seamlessly between locations, such as from an office to a home to public hotspots, etc.

Certain 802.11-specific issues exist, including radio access, access point (AP) location, caller location, and emergency call admission. In regard to radio access, no priorities for emergency calls currently exist in the 802.11 standards, and there is no means to distinguish an emergency call from a regular call for the WLAN access network. The location of an AP or a STA is currently unknown to the network in a non-proprietary manner, even if for example, the AP's identification can easily be determined. It is also not currently possible to map the caller's location in a non-proprietary manner.

In regard to admission, a tightly managed WLAN may prevent emergency callers from establishing an emergency call if the caller is not authorized to enter the network. The normal connection procedure between a STA and an AP requires the STA to send an Association request, followed by negotiation with the AP prior to associating the STA to the AP. If the STA is unable to indicate that it is making an emergency call, it would have to go through the entire association procedure to determine if it could be admitted. As an example of this type of difficulty, if a STA does not have the proper password or authentication credentials to access the system (if the AP is configured to require passwords or require authentication credentials, as might exist for example with a private hotspot or enterprise/office WLAN), the AP will bluntly refuse the STA's association request. But even if the STA has the proper password or authentication credentials, the AP could still refuse admittance to the network based on its configured maximum capacity for voice users. In this case, the right decision for the AP would be to admit this new emergency call (at the highest priority) and to discontinue another existing voice call. Because the AP currently lacks means to make this distinction in the first place, such a feature cannot be implemented with existing state-of-the-art WLAN technology. Contrast this with the operation of a cellular system, in which any device can make an emergency call, even a device without a SIM card.

SUMMARY

The present invention proposes various system operation aspects for enabling emergency call handling support with 802.11 and 802.15 technology. Some of the proposals pertain to new L2 signaling messages or information elements to indicate emergency calls to APs. New procedures and control mechanisms are proposed for emergency situations. In addition, procedures for dual-mode (WLAN and second generation (2G) or third generation (3G) cellular) implementations are addressed. Because emergency call requirements are often coupled to regulatory requirements on location reporting of the emergency caller's position, means and signaling procedures are proposed to allow requesting and reporting of geographic positions in a WLAN network. The position information can be coupled to emergency calls or can be implemented separately.

A benefit of a STA being able to identify an emergency call is that simple logic can be installed at the AP that allows the AP to distinguish between a STA that it should treat normally (i.e., should follow regular association procedures) and a STA that should be admitted under all circumstances, regardless of how the network is configured (i.e., bypass any security requirements to admit an emergency call).

Several methods are provided for communicating emergency call capability information between a station and an access point (AP) in a wireless local area network. The methods include advertising by the AP of its emergency call capabilities and announcing by the station of its emergency call capabilities. The AP can advertise its emergency call capabilities in a beacon frame, a probe response frame, a reassociation response frame, or a reauthentication response frame. The station can announce its emergency call capabilities in an association request frame, a reassociation request frame, an authentication request frame, or a reauthentication request frame.

A method for supporting an emergency call in a WLAN begins by initiating an emergency call by a STA on the WLAN. The emergency call is received by an AP on the WLAN and is admitted without requiring the STA to perform an authentication procedure. The STA is provided with emergency call related settings to permit the STA to access the WLAN.

A method for supporting an emergency call in a WLAN begins by initiating an emergency call by a station on the WLAN. The emergency call is received by an AP on the WLAN and is admitted without requiring the STA to perform an authentication procedure. The emergency call is routed to an emergency call center.

A method for supporting an emergency call in a WLAN begins by providing an emergency BSS ID to a STA, the emergency BSS ID being used only for emergency calls Any emergency call initiated by the STA uses the emergency BSS identifier.

A method for supporting an emergency call in a WLAN begins by initiating an emergency call by a STA on the WLAN. The emergency call is received by an AP on the WLAN. A determination is made whether the STA has sufficient capabilities to complete the emergency call. If the STA does not have sufficient capabilities to complete the emergency call, then an element of the infrastructure network acts as a proxy for the STA to complete the emergency call.

BRIEF DESCRIPTION OF THE DRAWINGS

A more detailed understanding of the invention may be had from the following description of a preferred embodiment, given by way of example, and to be understood in conjunction with the accompanying drawings, wherein:

FIG. 2B is a diagram of a MAC frame with an information element (IE) indicating an emergency call;

FIG. 3 is a diagram of a standard ready to send (RTS) frame;

FIG. 4A is a diagram of a RTS frame with a bit flag indicating an emergency call;

FIG. 4B is a diagram of a RTS frame with an IE indicating an emergency call;

FIG. 5 is a flowchart of a method for using a RTS frame as shown in FIG. 4A or 4B;

FIG. 7 is a diagram of a SOS beacon frame indicating an emergency call;

DETAILED DESCRIPTION OF THE PREFERRED EMBODIMENTS

Hereafter, the term "station" (STA) includes, but is not limited to, a wireless transmit/receive unit (WTRU), a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

The present invention is applicable to all WLANs, personal area networks (PANs), and metropolitan area networks (MANS), but in particular to 802.11-based WLANs, 802.15-based wireless PANs, 802.16/20 based wireless MANS, and equivalents thereto. In one realization, the present invention is applicable to WTRUs implementing a combination of these access technologies including WLAN, PAN, MAN, and cellular multi-mode WTRUs.

The present invention for handling emergency support will be described hereinafter as being grouped into several major areas. This is, however, for convenience of explanation and should not be taken as a limitation of the invention.

I. Air Interface Related Signaling/Support and Procedures

A. Indication of Emergency Calls in MAC Frames and MAC Signaling Messages

Figure 1:
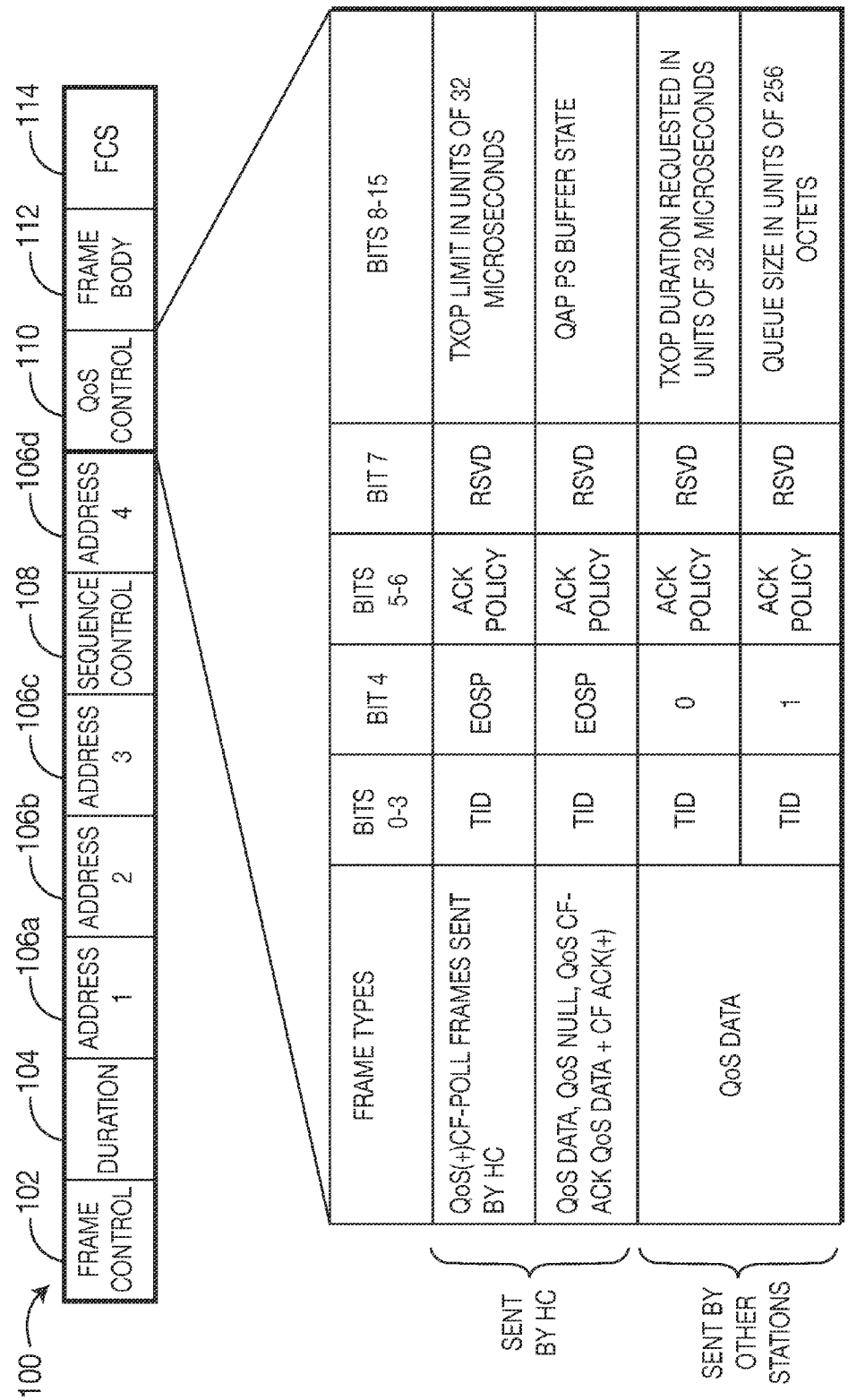
FIG. 1 is a diagram of a standard medium access control (MAC) frame.

A standard MAC frame 100 is shown in FIG. 1. The MAC frame 100 includes a frame control field 102, a duration/ID field 104, one or more address fields 106a-106d, a sequence control field 108, a quality of service (QoS) control field 110, a frame body 112, and a frame check sequence (FCS) field 114. The QoS control field 110 is divided into a plurality of subfields, as shown.

A priority for emergency calls can be indicated in MAC frames by a bit flag, by an emergency message type IE, by an emergency message field part on an existing or new IE, or by an emergency call code implemented using a reserved (currently unused) value in any existing IE or field of a MAC frame. The indicator allows an AP to know that it needs to admit the emergency call. For similar purposes, QoS priorities or requirements are indicated by means of QoS classes (for example DiffServ). Any existing MAC frame type (control, management, or data) can be modified to include the emergency call indicator. The emergency call indicator can be added to any location in the MAC frame, in the header or the body using any of the mechanisms described.

Figure 2A:
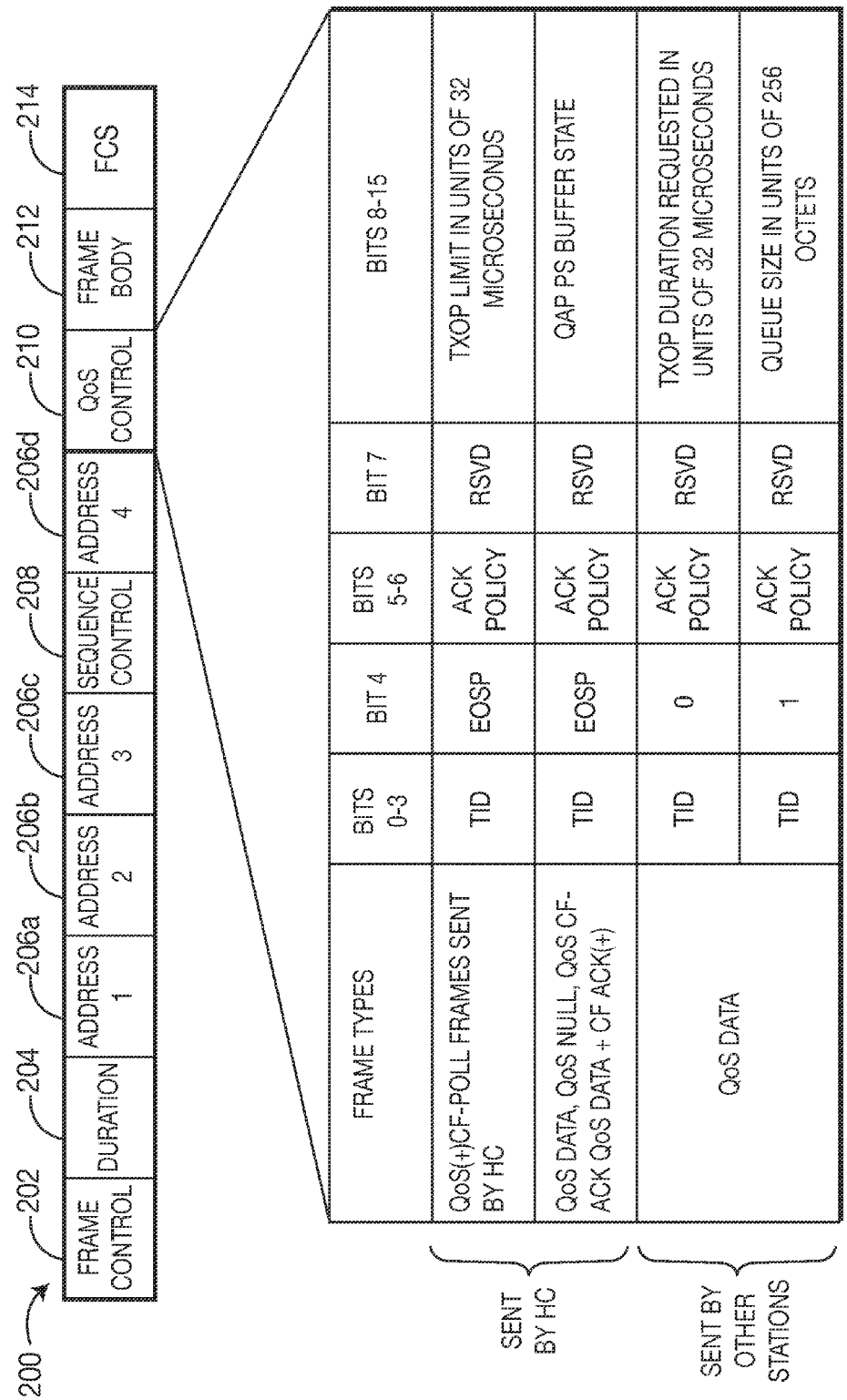
FIG. 2A is a diagram of a MAC frame with a bit flag indicating an emergency call.

As shown in FIG. 2A, a MAC frame 200 includes fields 202-214, which are the same as fields 102-114 described above in connection with FIG. 1. In one embodiment, a simple bit flag 220 is used to indicate to the receiver that this is an emergency call. As shown in FIG. 2A, one possible location for the bit flag 220 is in the reserved bit (bit 7) of the QoS control field 210. A person of ordinary skill in the art would note that it is possible to place the bit flag 220 in any currently reserved location in any of the existing header or frame body fields in the MAC frame.

As shown in FIG. 2B, a MAC frame 250 includes a frame control field 252, a length field 254, and an emergency call IE 256 to indicate an emergency call. The emergency call IE 256 can include, but is not limited to, an emergency call flag 260, a reason code field 262, a capability information field 264, a location information field 266, a voice codec application field 268, and additional fields 270. The emergency call IE 256 can be added to any MAC frame. In addition, the information contained in the emergency call IE 256 can be added to an existing IE type.

The emergency call flag 260 can be a simple indicator (e.g., a bit flag) to identify that the call is an emergency call. The reason code field 262 indicates the reason for the emergency call (e.g., fire, medical emergency, etc.). The capability information field 264 includes the capabilities of the STA placing the emergency call and is used to assist in completing the emergency call as quickly as possible. The location information field 266 contains the location of the STA placing the emergency call. The voice codec application field 268 identifies the voice codec used by the STA, and is used in case there is any incompatibility between the STA and the AP attempting to handle the emergency call. Additional information that can be included into the emergency call IE (as fields 270) are timestamps and WTRU and/or operator service capability information.

Existing MAC frames under 802.11e have call priorities. The Transmission Specification (TSPEC) IE includes a three bit priority subfield in a transmission specification information field. The principles of the present invention can also be implemented in the TSPEC IE by defining a value for an emergency call. In cellular systems, a similar mechanism (a signaling frame) is used to send the call parameters to the network and includes a reserved field to identify emergency calls. As is known in the art, the TSPEC IE is used in an ADDTS (add traffic stream) frame. The modified TSPEC IE described herein can therefore be used in an ADDTS frame. Similarly, a new IE containing the same information can be used in the ADDTS frame to indicate an emergency call.

While the foregoing description has particularly described 802.11-based MAC frames, the concepts of extending the MAC frames can be applied to any type of MAC frame. For example, an Ethernet type of MAC frame could also be similarly modified. Such a MAC frame is used in, for example, EAPOL (Extensible Authentication Protocol Over LAN) frames that are exchanged for security reasons in a WPA (Wi-Fi Protected Access)-enabled network. Furthermore, this concept can be extended to define a new Ethertype, since an Ethertype is indicated by a bit in the header.

B. Virtual BSS ID for Emergency Calls

In a virtual BSS setting, a single physical AP is configured to operate as more than one BSS (i.e., a virtual BSS), with each BSS having its own ID. One BSS ID can be reserved for use for emergency calls only. Since each MAC frame transmitted in a WLAN includes the BSS ID, an emergency call would use the emergency BSS ID when attempting to transmit an emergency call.

A STA can receive the emergency BSS ID on the downlink from the AP. For example, the emergency BSS ID can be sent by the AP in a response frame (e.g., a probe response, an association response, or a reassociation response). It is noted that the emergency BSS ID can be provided to the STA be various other methods.

C. AP or STA Advertises its Emergency Call Capabilities

The AP advertises its ability and willingness to support emergency calls. For example, the AP can advertise that it is emergency call enabled and provide parameters to STAs in order to associate to the AP to complete an emergency call. This advertisement can also include an indication whether the emergency call capability in the AP is presently active. This type of advertisement is likely to be used in a public hotspot, where many different types of users can be reasonably expected.

An AP capability IE can be used in beacon frame or in probe frames, where the AP indicates its emergency call capabilities. In the current beacon frame, there is a two byte capability field, but all of the bits in this field are used. An extendable capability IE has been added to the end of the frame to indicate all new AP capabilities. The bit flag described above can be added to the extendable capability IE to indicate the AP's emergency call capability. In addition, the AP's emergency call capability indication can be added to reassociation or reauthentication frames.

Alternatively, the STA can announce its ability to support emergency calls. This information can include, for example, which type of voice coding is being implemented by the STA. The STA can add its emergency call capability information to an association request frame, a reassociation request frame, an authentication request frame, or a reauthentication request frame. The information can be transmitted by using a new IE or by adding one or more bit flags to an existing IE. One benefit of the STA announcing its emergency call capabilities is that the AP can store this information in case the STA has to place an emergency call, to more quickly process the emergency call.

If the STA provides it emergency call capabilities to the AP, the AP should also be aware whether the WLAN to which it belongs can support emergency calls Every WLAN may not have the ability to connect to an emergency call center. For example, the WLAN could be configured as a data collection network (e.g., a factory telemetry network) and might not have an Internet connection which would permit the STA to connect to an emergency call center. In such circumstances, the AP should inform the STA that the WLAN cannot support emergency calls, so that the STA can attempt to locate another WLAN. A similar mechanism can be employed in the event that the WLAN's Internet connection is temporarily unavailable for some reason.

D. Location Information

Location information can also be attached to these new MAC frames 200, 250 (e.g., in the location information field 266), in addition to conveying the emergency call establishment reason. For example, the AP or STA can use the basic service set (BSS) ID, the AP or STA MAC addresses, static or dynamically assigned IP addresses, or global positioning system (GPS) information from an AP or STA implementing this functionality, and forward this information to the emergency call center. It is noted that the location information can also be conveyed separately from the emergency call information.

Other means of locating the emergency STA include, but are not limited to, identifying the STA placing the emergency call by caller ID, utilizing a callback number, and using known addresses to help locate the STA by the emergency call center (e.g., using the MAC addresses of the current point of attachment for the STA, such as the AP or the network ID, or AP geographical coordinates).

For example, a MAC signaling mechanism for a WLAN can be used where the AP can request the position from a STA. The STA would report back to the AP with its position. One possible implementation includes the use of assisted GPS (A-GPS) coordinates, that are currently in widespread use in cellular handsets. Multiple positioning methods can be supported for different access networks, including, but not limited to, uplink time difference of arrival (U-TDOA), enhanced observed time difference (E-OTD), idle period downlink observed time difference of arrival (IPDL-OT-DOA), A-GPS, Universal Geographic Coordinates (for example, as defined in IEEE standard 802.11k or IETF RFC 3825) and methods using WLAN AP locations, cell site, or sector information and timing advance or roundtrip time measurements. While the preceding examples of conveying location information have been particularly mentioned, one skilled in the art would note that any format to convey geographic coordinates can be used.

The emergency call functions can be performed independently from (yet complementary with) the location reporting functions. To illustrate, it is possible to: (1) attach location information to the emergency call signaling frames when the STA actually issues the emergency call, and (2) signal location updates as a stand-alone functionality without an emergency call. An example of the latter would be to keep the AP informed and updated about the latest STA position either periodically (e.g., every few seconds), polled as part of the AP background operation, or by unsolicited regular location reporting by the STA to the AP. Maintaining location information at the AP may be preferable because when the STA issues the emergency call, the AP already has a reasonably recent estimate of the STA's position, such that the STA is not required to explicitly piggyback its location onto the emergency call request.

For example, such stand-alone STA location information reporting can be used to allow implementation of location-dependent services in a WLAN network, in parallel to addressing regulatory requirements.

As such, the position information can also be provided to location services (LCS) applications existing within an interworking WLAN (I-WLAN), public land mobile network (PLMN), or in the STA. In addition, the originating party's serving cell identity or serving AP identity can be provided to the LCS client.

E. Extend the Existing RTS/CTS Frame Exchange Mechanism and Procedure

A standard RTS frame 300 is shown in FIG. 3. The RTS frame 300 includes a frame control field 302, a duration field 304, a receiver address (RA) field 306, a transmitter address (TA) field 308, and a FCS field 310.

A STA that wants to transmit an emergency call transmits an extended RTS frame 400 containing a special signaling flag as shown in FIG. 4A or an extended RTS frame 450 containing a new IE as shown in FIG. 4B.

FIG. 4A shows an RTS frame 400. Fields 402-410 of the RTS frame 400 are the same as fields 302-310 of the RTS frame 300 described above in connection with FIG. 3. The frame control field 402 has several subfields, including a protocol version subfield 412, a type subfield 414, a subtype subfield 416, a to distribution system (DS) subfield 418, a from DS subfield 420, a more fragments subfield 422, a retry subfield 424, a power management subfield 426, a more data subfield 428, a Wired Equivalent Privacy (WEP) subfield 430, and an order subfield 432.

The signaling flag can be added to any reserved bit in the RTS frame 400. Potential locations for the reserved bit include the protocol version subfield 412, the type subfield 414, and the subtype field 416. It is noted that one skilled in the art could place the signaling flag in any reserved bit in the RTS frame 400.

FIG. 4B shows an extended RTS frame 450, including a frame control field 452, a duration field 454, a RA field 456, a TA field 458, a purpose IE 460, and a FCS field 462. The purpose IE 460 can be similar in content to the emergency call IE 256, described above. All STAs receiving the extended RTS frame 450 are then required to stop any transmission attempt for a pre-determined amount of time to idle the wireless medium and to give the STA in emergency an opportunity to transmit.

In one embodiment, upon receipt of an extended RTS frame, the receiving STAs enter a modified backoff process in order to give the STA placing the emergency call a higher probability to succeed in obtaining access to the medium. Two implementations of modifying the backoff process are possible: (1) shortening the backoff time for the STA placing the emergency call relative to other STAs, or (2) lengthening the backoff time for non-emergency STAs. In either implementation, the end result is that the emergency STA has a shorter backoff time than non-emergency STAs.

A method 500 for using the RTS frame 400 or 450 is shown in FIG. 5. The purpose of the method 500 is to idle the transmission medium in order to permit a STA to transmit an emergency call. The method begins with a STA placing an emergency call by sending a RTS frame 400 or 450 (step 502). An AP receives the RTS frame (step 504) and responds to the STA with a standard CTS frame (step 506). The backoff type to be used by the AP is determined (step 508). There are two possible backoff types, both of which would permit the STA placing the emergency call to access the medium prior to all other STAs waiting to transmit.

If the backoff type is that the STA in emergency (i.e., the STA placing the emergency call) has a shorter backoff time, then the STA in emergency waits for the shortened backoff time (step 510) and then transmits the emergency call (step 512). All other STAs that are attempting to access the medium wait for the standard backoff time (step 514) and are then able to transmit (step 516). The method then terminates (step 518).

If the backoff type is that all other STAs have a longer backoff time (step 508), then the STA in emergency waits for the standard backoff time (step 520) and transmits the emergency call (step 522). All of the other STAs wait for a longer backoff time (step 524) and are then able to transmit (step 516). The method then terminates (step 518).

In general, when a STA enters a backoff procedure, the STA attempts to transmit randomly in one out of a series of N timeslots. If there is a transmission collision, the STA will backoff again and increase the value of N, up to a predetermined maximum value for N. Before a STA can attempt to transmit, the STA must wait for M timeslots. This basic procedure provides any STA an equal chance of winning access to the medium. In 802.11e, to implement QoS, there are two ways to ensure that a particular station has a greater chance of winning access to the medium. The first is to reduce the value of M, thereby giving the STA a shorter wait time. The second is to use a smaller value for N, which increases the chances that a STA will be able to transmit in a particular timeslot.

In the method 500, there are several possible means for a STA to know which backoff value to use. A first means is to use hard-coded values for M and N in connection with an emergency call, such that these hard-coded values for M and N will be used by a STA in emergency. A second means is to explicitly signal values for M and N from the AP to the STA in emergency. The AP would typically send those parameters to the STA by either using broadcast or dedicated management frames during normal system operation. STAs read the emergency call-related configuration parameters to be used in case they need to set up an emergency call. One example is that the AP, as part of the Beacon or Probe Response management frames, sends other BSS configuration values to all STAs in its BSS. Adding the emergency call-related M and N parameters is a natural extension to these. For example, 802.11e QoS-related configuration parameters per access category (backoff values, windows, etc.) to be used by all STAs in the BSS are signaled today by the AP using a similar mechanism.

A third means is a combination of the first and second means, by which a STA has hard-coded default values for M and N that it uses normally, and if the STA is in emergency, the AP will signal new values for M and N to override the hard-coded default values. One skilled in the art could envision additional means for communicating the appropriate backoff times to a STA in emergency and all other STAs seeking access to the medium.

F. Mandated Switch-Over to Another Radio Technology for Dual-Mode WLAN STAs (for Example 3G and WLAN)

Figure 6:
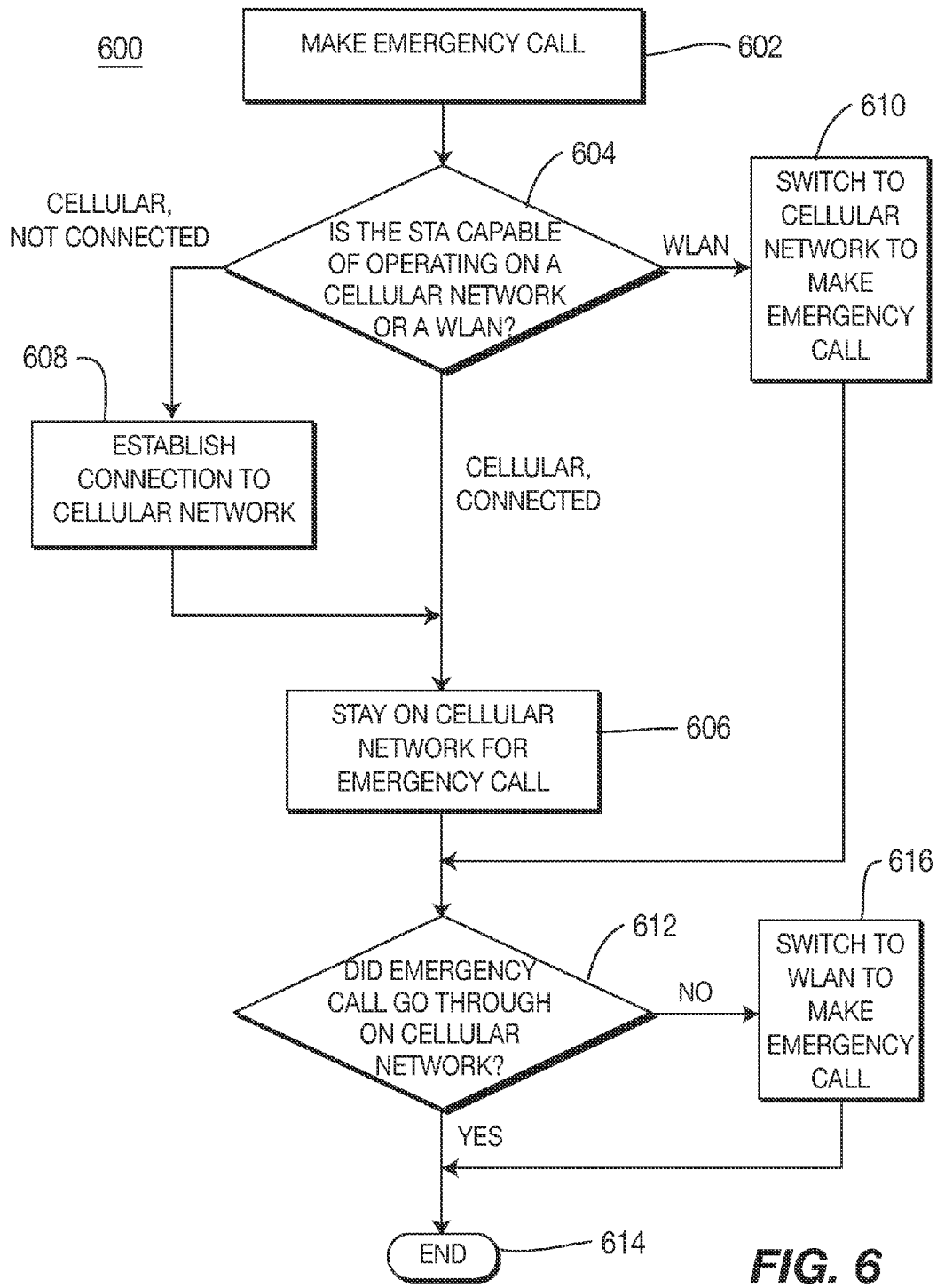
FIG. 6 is a flowchart of a method for switching radio technologies to complete an emergency call.

In case of an emergency, a dual-mode WLAN STA will attempt any emergency call first on the cellular network, instead of on the WLAN. This is in principle a "hard-coded"

procedure in the STA alone. A method 600 for implementing this procedure is shown in FIG. 6.

The method 600 begins by the user making an emergency call at the STA (step 602). A determination is made whether the STA is capable of operating on a cellular network or a WLAN (step 604). If the STA is operating on a cellular network (i.e., is currently connected to the cellular network), then the STA remains on the cellular network for the emergency call (step 606). If the STA is capable of operating on the cellular network, but is not presently connected to the cellular network, then the STA establishes a connection to the cellular network (step 608) and makes the emergency call on the cellular network (step 606). If the STA is operating on a WLAN, then the STA switches to the cellular network to make the emergency call (step 610).

After the emergency call has been placed, a determination is made whether the emergency call went through on the cellular network (step 612). If so, then the method 600 terminates (step 614). If the emergency call did not go through on the cellular network, then the STA switches to the WLAN to make the call (step 616) and the method terminates (step 614).

In case an emergency call needs to be issued by a dual-mode WLAN-cellular handset, the preferred procedure is to have the handset fallback onto the cellular modem (i.e., establish the emergency call on a cellular radio link), because emergency call support may not be available or may be less reliable over the WLAN.

Alternatives for the method 600 include: (1) establishing a preferred, mandated, or recommended order of radio technologies (e.g., WLAN or cellular) to switch to when attempting to send an emergency call; (2) the system operator configures emergency call behavior on a SIM card or similar device for dual mode handsets; (3) maintain a VoIP call on the cellular network or move the call onto a traditional circuit switched voice channel in case of an emergency; (4) the system operator signals a preferred local order of radio technologies over the wireless interface; or (5) the user manually configures the policy setting.

G. Bypassing Authentication and Security when Attempting an Emergency Call

A procedure is mandated that any 802.xx STA seeking to establish an emergency call in a WLAN must be allowed by the AP. This includes bypassing authentication like 802.1x and other security measures on the network side. This procedure could be triggered by using the extended RTS/CTS method 500 (as shown in FIG. 5) or by a bit flag, IE, header, reserved information field, or bit/sequence value in the MAC frame (as shown in FIGS. 2A and 2B).

In current WLAN implementations, the authentication status of each STA is tracked via a state machine, and is referred to as 1x port filtering. A STA may transmit on the WLAN only if it is authenticated, and will otherwise be blocked by the port filter. But since a STA placing an emergency call must be admitted to the WLAN, this presents a problem from an authentication viewpoint. To overcome the authentication problem, the port filter can be adjusted to easily determine when a STA is sending an emergency call and to permit the emergency call to continue. For example, the indication could be provided as described above in connection with a new Ethertype or modifying an existing Ethertype.

Access control in a WLAN is intrinsically tied to security. Under the current standards, there is no way to get around the access control in the AP, in that all STAs have to perform an authentication process in order to associate to the AP. An AP should admit an emergency call even if the STA lacks the proper credentials to associate to the AP. There are two options for the AP upon identifying an emergency call; the identification of an emergency call should be performed at L2. The first option is to bypass the AP's security entirely and admit the call without requiring authentication. The second option is to admit the call with different security settings. For example, an emergency call can be provided with a specific emergency-related access code or security key.

In the event that an AP grants access to an emergency call by bypassing the AP's security, care needs to be taken to prevent abuse of the security bypass from calls pretending to be emergency calls (e.g., through spoofing signaling information). One solution to this problem includes semi-static routing for all emergency calls, such that an emergency call is automatically routed to an emergency call center without providing general access to the WLAN. By using semi-static routing for emergency calls, even spoofed emergency calls would be routed to the emergency call center.

II. WTRU Behavior/Procedure in Case of Emergency

A. WLAN Sends SOS Beacon Signal to Facilitate in Finding the Caller

A procedure is mandated in the STA or configured by the network that once the emergency call is over (or even during), the STA and/or the involved AP start transmitting SOS type signaling frames 700 as shown in FIG. 7 on regular intervals.

An SOS signaling frame 700 is a modified version of a Probe Request frame. The SOS signaling frame 700 includes a frame control field 702, a duration field 704, a destination address (DA) field 706, a source address (SA) field 708, a BSSID field 710, a sequence control field 712, a SSID IE 714, a supported rates IE 716, and an emergency call IE 718. The emergency call IE 718 can be the same as the emergency call IE 256 described above in connection with FIG. 2B. It is noted that the supported rates IE 716 is optional, and can be eliminated from the SOS signaling frame 700 without affecting its functionality.

In one embodiment, the SOS signal frame can be defined as a Probe Request frame sent with short interframe space (SIFS) priority or priority interframe space (PIFS) priority, to ensure access to the medium. The SOS signal frame contains new emergency call related elements in emergency call IE, such as 911 ID (e.g., caller ID), equipment details (such as international mobile equipment identification (IMEI)), network affiliations, user name, and emergency reason code. The reason code may be obtained by the device prompting the user to identify the reason for the emergency call (e.g., "press 1 if fire emergency", etc.). A reason code would provide some ability to handle the emergency in case there is no way to terminate the in-progress call.

The SOS signal frame can be scheduled for transmission every 100 mSec or so to facilitate location logging and tracking. An AP would be required to log any SOS signal frame reception with a timestamp and details of the signal. The signal strength details include signal strength, signal quality, antenna azimuth and gain, and caller details such as IMEI, user name (if available), and other 802.11 device information useful for identity and capability purposes. An AP receiving an SOS signal frame would also be required to report the event to an emergency network node responsible for emergency response, radio resource coordination, location, and tracking of the calling device.

This is an active probing mechanism where the SOS signaling frames are sent and can be received by emergency workers as they approach the caller. One analogy is the emergency beacon in the black box of an airplane. A new MAC frame can be introduced for this purpose or an existing MAC frame, for example a probe request frame, can be extended by new IEs (such as the emergency call IE 256) to fulfill this purpose.

Figure 8:
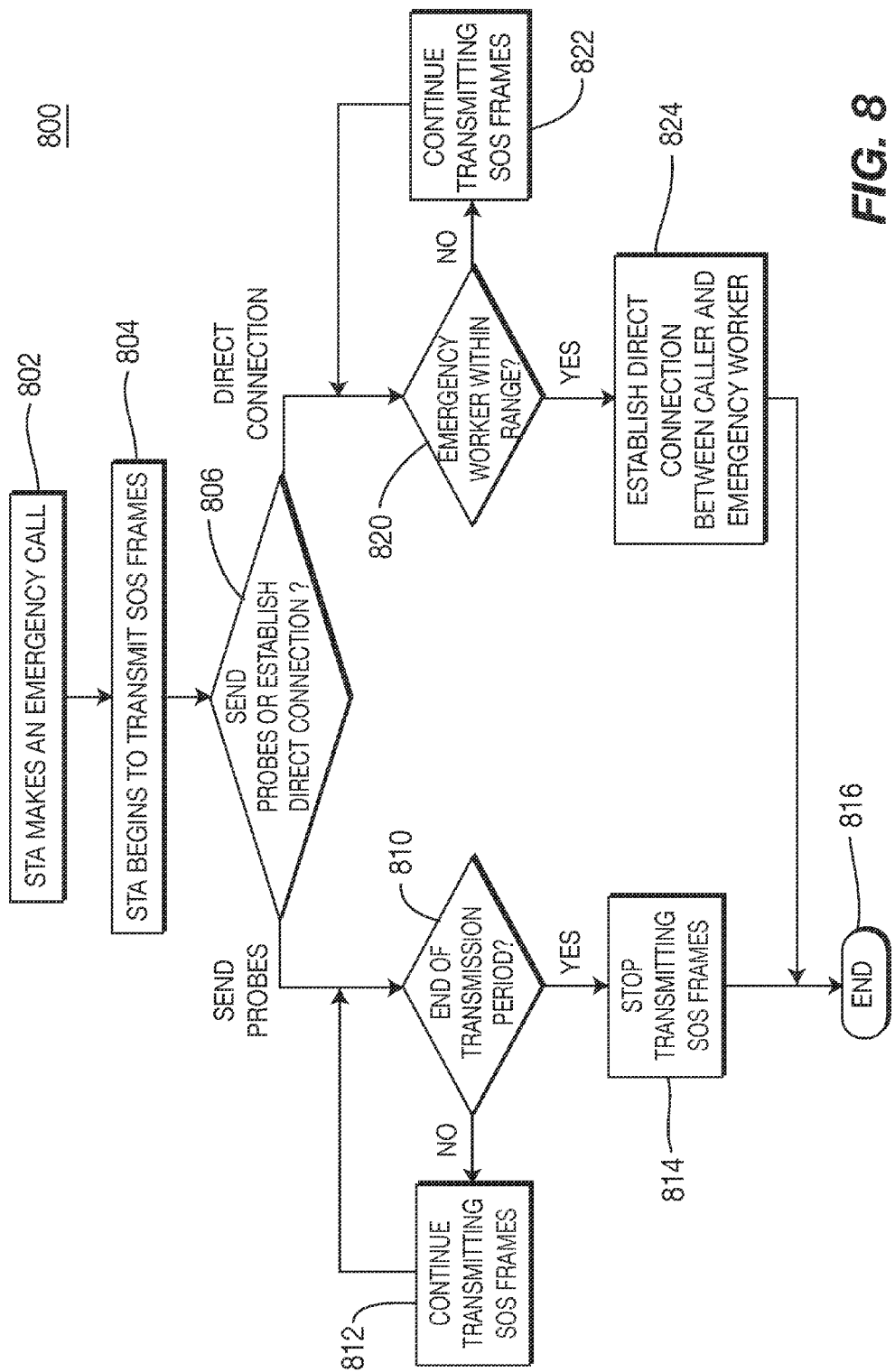
FIG. 8 is a flowchart of a method for transmitting and using the SOS frame shown in FIG. 7.

A method 800 for utilizing a SOS signaling frame is shown in FIG. 8. The user makes an emergency call from a STA (step 802). The STA begins to transmit SOS frames (step 804). Based on the desired implementation, the SOS frames can either be sent as probes or be used to establish a direct connection with an emergency worker (step 806).

If the SOS frames are to be sent as probes, a transmission period is set and a determination is made whether the end of the transmission period has been reached (step 810). If the transmission period has not ended, then the STA continues transmitting the SOS frames (step 812) and the method returns to step 810. If the end of the transmission period has been reached (step 810), then the STA stops transmitting the SOS frames (step 814) and the method terminates (step 816).

If the SOS frames are to be used to establish a direct connection with an emergency worker (step 806), then a determination is made whether the emergency worker in within range of the STA (step 820). If the emergency worker is not within range of the STA, then the STA continues transmitting SOS frames (step 822) and the method continues with step 820. If the emergency worker is within range of the STA (step 820), then the STA stops transmitting SOS frames and establishes a direction connection between the caller and the emergency worker (step 824) and the method terminates (step 816).

In a first alternative (steps 810-814), the SOS frames transmitted by the STA could be triggered by signaling from the AP or higher layer protocols like session initiation protocol (SIP) once the emergency call is over. The duration/frequency of the SOS frames are contained in this trigger signal. Sending the SOS frames after the emergency call is over prevents transmission of unnecessary SOS frames in case the emergency call was a mistake or if there was no need for an emergency worker to come in response to the call.

In a second alternative (steps 820-824), a direct VoIP connection between the emergency worker and the caller is established when they are within range of each other. Other STAs that hear the SOS frames may treat the SOS frames like the extended RTS frame described above in connection with FIGS. 4A, 4B, and 5 (i.e., the other STAs will not try to access the medium, so that the emergency caller has better access to the bandwidth).

B. Network (for Example, the AP) Implements a Call Back Functionality to Handle Emergency Calls Once an emergency call is established, the WLAN maintains an active connection to the user that initiated the emergency call for a certain period after the emergency call is over in case of call back. This functionality may be transparent to the user.

III. Functionality in the Infrastructure

A. Proxy Function

Figure 9:
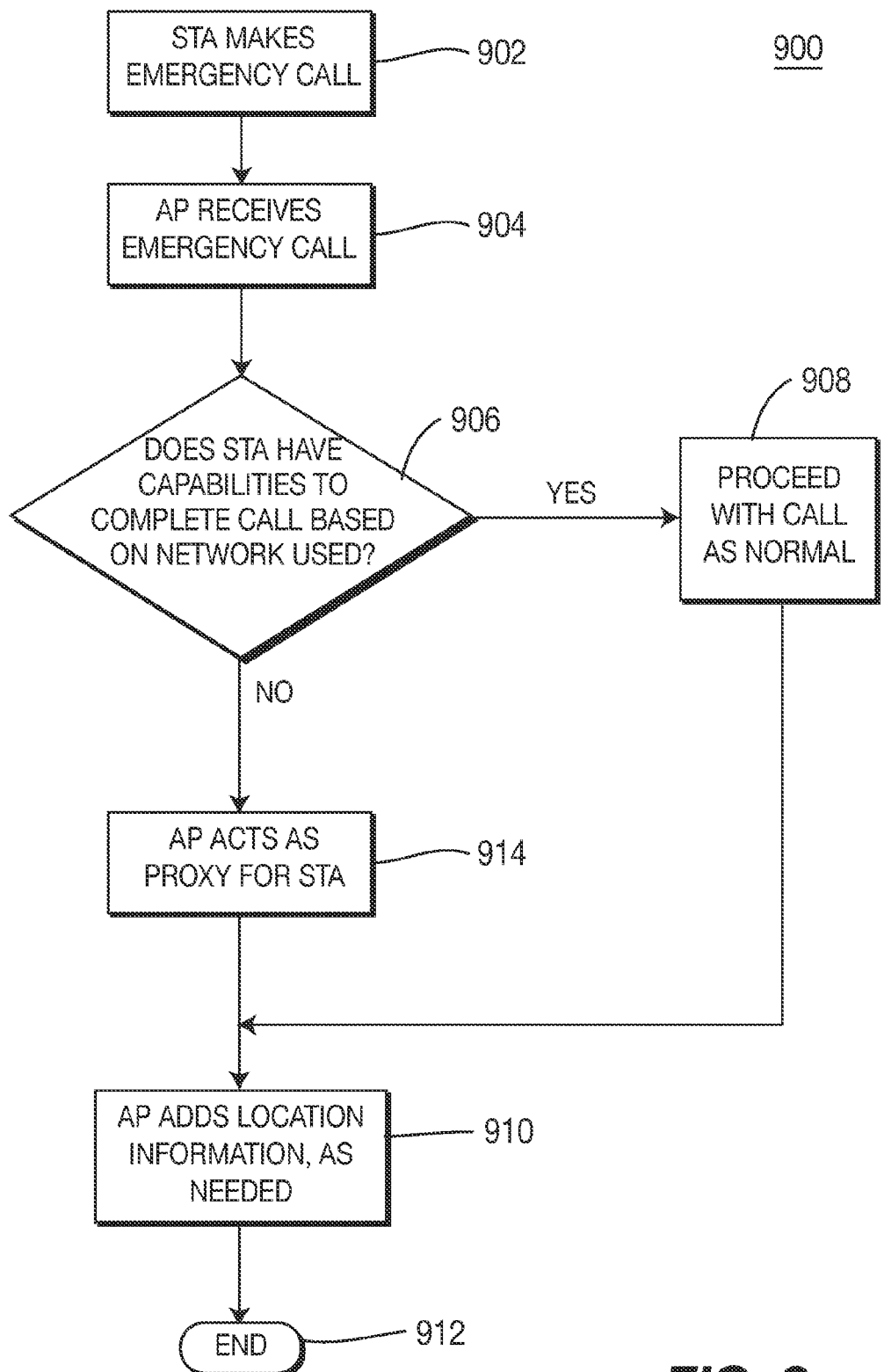
FIG. 9 is a flowchart of a method to determine whether to apply a proxy function.

A method 900 for determining whether an AP needs to act as a proxy for the STA is shown in FIG. 9. The STA makes an emergency call (step 902) and the AP receives the emergency call (step 904). A determination is made whether the STA has the capabilities to complete the emergency call based on the network used to carry the call (step 906). The AP checks if the STA has all required functionality (e.g., SIP/H.323 protocol termination, vocoder, etc.) to support the call. This information may be indicated as part of the MAC frame (e.g., MAC frames 200, 250) or it may be part of the subscriber information in the network that the AP can access.

If the STA has all of the necessary capabilities, then the STA proceeds with the call as normal (step 908). The AP can add location information to the call as necessary, including the location of the STA and/or the location of the AP (such as the network ID, the AP's MAC address, etc.) (step 910). The method then terminates (step 912).

If the STA does not have all of the necessary capabilities to complete the call (step 906), then the AP acts as a proxy for the STA, providing any necessary functionality (step 914). The AP adds location information to the call as needed (step 910) and the method terminates (step 912).

If the AP determines that the STA does not have all the required functionality to fully complete the emergency call in the current environment, then the AP will act as a proxy for the STA (step 914). For example, if the STA does not have SIP protocol support, then the AP can act as a SIP proxy for the STA. As another example, if the STA has SIP support but the network only supports H.323, then the AP can interwork the SIP messages from the STA to 11.323 messages to the rest of the network. In the extreme case that the STA does not even have a vocoder, the AP can download a thin vocoder client to the STA and interwork to more standard vocoders elsewhere in the network. It is noted that the AP does not have to provide all of the proxy functions for the STA; these functions could be provided by another element in the infrastructure network such as a dedicated gateway node. By moving the proxy functions out of the AP, this provides greater flexibility to the WLAN to handle the emergency call in the event of an interruption in the WLAN's Internet connection.

Another method is that the AP spoofs (i.e., reads the contents and/or type information even if it is officially not supposed to) on the contents of the IP packets that are used for signaling or normal traffic by the STA and its correspondent in the network. For example, SIP signaling protocol messages over IP are typically used today for call handling. Such SIP signaling contains useful information, such as capability information and destination addresses, for the AP to fulfill its role as proxy. In addition to the previously described methods, if the AP extracts such information from spoofing on the STA-remote destination higher layer (i.e., above L2 MAC) message contents, it can fulfill its role more efficiently. A person skilled in the art would recognize that SIP is one example of a management protocol for IP-based calls, and that other equivalent protocols exist and are widely used in the industry. Therefore, this method is not limited to SIP alone.

B. Linking an AP to an Emergency Call Center

Once an AP learns of a STA making an emergency call, the AP needs to establish a link to an emergency call center in order to properly route the call from the STA. There are several possible transfer mechanisms to get the emergency call from the AP to the call center. For example, the AP can communicate with a gateway, linking it to the call center.

The emergency network node concept can be extended to include an emergency response operations center with man-in-the-loop capability. The emergency network node would be an extended service set (ESS) or network tailored to the infrastructure application. For example, on a university campus, the designated emergency network node would be the campus police department. As another example, in a manufacturing plant, the emergency network node would be the security office. The emergency network node would include an operator who would receive the VoIP call, log call information, screen calls, and then place an emergency call on a public switched telephone network (PSTN) to alert the appropriate authorities.

The emergency network node concept can be further extended to include an automated node with a direct line to a PSTN. The automated node would act as voice circuit bridge to dial and connect the wireless caller to the PSTN emergency center.

The method for connection to the emergency network node could be extended to include the ability to route and handle a call without authentication, authorization, or security features. This would permit a direct unencrypted connection or a tunneled connection between the wireless caller and the emergency network node.

The function of the emergency network node could be extended to include call handing, call handoff, and roaming coordination. This functionality would preauthorize resources in neighbor APs (APs adjacent to the AP serving the wireless call), so that the caller may roam without losing the wireless connection and without the need to reestablish a new emergency call when moving across AP boundaries, thus eliminating duplicate calls on same emergency. In one implementation, a MAC frame containing an emergency IE as described above could be used so that after a handoff is completed the new AP can continue the emergency call without interruption.

IV. Interworking

Interworking, which relates to how the network-side components interact, is also important in handling emergency calls, especially when an emergency call has to cross different network types in order to be completed. One solution to this issue is that when a new user enters the system, it indicates its emergency call capabilities. A centralized database is updated with the new user's information such that this information is readily available should the user place an emergency call and reduces the latency that would otherwise be required to complete the call by having to exchange this information across the network. As with the location information, the emergency call capability information can automatically be updated in the background to constantly provide updated information.

The concepts of the present invention can be extended beyond the specific examples illustrated above. For example, the present invention can be extended to mesh networks and ad-hoc networks. The emergency call capabilities described herein can be implemented in any part of a network, and are not limited to an AP. For example, these capabilities can be implemented in a STA, distributed across several APs, in an access controller, or in a call server.

As an alternative, instead of a human user, the present invention can be extended to machine-to-machine usage scenarios for emergency handling with WLANs. One possibility would be using 802.11 in home security systems, i.e., a WLAN is used in place of hard wired telephone lines (that can be cut). In this example, instead of a human user generating a WLAN emergency call, the home security system auto-generates an emergency call to a security call center when someone breaks in. Alternatively, the home security system could start sending emergency SOS frames, as described above.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a station (STA), the method comprising:
   receiving, from a single access point (AP) in an 802.11 wireless local area network (WLAN), a first frame that contains a first security credential for associating with a network;
   receiving, from the single AP, a second frame that contains an emergency call security credential;
   selecting a BSSID for an outgoing call;
   transmitting, from the STA, an association message that includes the first security credential or, on a condition that the outgoing call is an emergency call, the emergency call security credential; and
   receiving, from the single AP, access to the network on a condition that the association message includes the first security credential, and receiving, from the single AP, emergency access to the network on a condition that the association message includes the emergency call security credential, wherein the emergency access to the network is for an emergency call only.

2. The method of claim 1, further comprising:
   receiving an indication regarding an emergency call capability of the single AP.

3. The method of claim 2, wherein the indication regarding the emergency call capability of the single AP is received in an AP capability information element (IE).

4. The method of claim 3, wherein the AP capability IE is greater than two bits in length.

5. The method of claim 1, further comprising:
   receiving an indication regarding an emergency call capability of the single AP being active.

6. A method for use in a station (STA), the method comprising:
   receiving a plurality of basic service set identifiers (BSSID)s from a single access point (AP) in an 802.11 wireless local area network (WLAN), wherein at least one of the plurality of BSSIDs is an emergency BSSID associated with an emergency call security credential for the 802.11 WLAN;
   selecting a BSSID for an outgoing call;
   transmitting, on a condition that the outgoing call is an emergency call, an access request indicating the emergency BSSID to the single AP; and
   receiving, from the single AP, a grant for only emergency call access based on the emergency call security credential for the 802.11 WLAN.

7. The method of claim 6, wherein the plurality of BSSIDs are received in a beacon frame.

8. The method of claim 6, wherein the emergency BSSID is received in a response frame.

9. The method of claim 8, wherein the response frame is a probe response frame, an association response frame, or a reassociation response frame.

10. The method of claim 6, wherein the receiver is further configured to receive an indication regarding an emergency call capability of the single AP.

11. The method of claim 10, wherein the receiver is further configured to receive an indication regarding the emergency call capability of the single AP being active.

12. The method of claim 11, wherein the indication regarding the emergency call capability of the single AP is received in an AP capability information element (IE).

13. The method of claim 12, wherein the AP capability IE is greater than two bits in length.

* * * * *